United States Patent [19]

Chung-Shan

[11] Patent Number: 4,653,534
[45] Date of Patent: Mar. 31, 1987

[54] WATER FAUCET WITH TIMING DEVICE
[76] Inventor: Shen Chung-Shan, No. 32, Ho-Ping Road, Hu-Wei Chen, Yun-Lin Hsien, Taiwan
[21] Appl. No.: 843,129
[22] Filed: Mar. 24, 1986
[51] Int. Cl.[4] .............................................. F16K 31/44
[52] U.S. Cl. .............................................. 137/624.12
[58] Field of Search ...................... 137/624.11, 624.12, 137/624.21

[56] References Cited
U.S. PATENT DOCUMENTS

| 2,098,815 | 11/1937 | Van Veen | 137/624.11 |
| 3,638,682 | 2/1972 | Heyer | 137/624.12 |
| 3,803,923 | 4/1974 | Hajny | 137/624.12 X |

Primary Examiner—Alan Cohan
Attorney, Agent, or Firm—Asian Pacific International Patent & Trademark Office

[57] ABSTRACT

It is a water faucet, which mainly comprises a control rod, a valve stem, and a clutch assembly being mounted between the control rod and the valve stem. The clutch assembly can only be driven by the control rod to rotate an angle of 90°. After the control rod rotating clockwise at a given angle, a timer will drive it counter-clockwise slowly toward original position thereof so as to supply wter during a given period of time. The inlet end of the water pipe is connected with a plug-in pipe, of which the tail end is furnished with several water holes. The plug-in pipe is to be inserted into a plug valve seat in the water pipe so as to open a spring type of automatic plug valve, and to let water enter into the faucet.

3 Claims, 10 Drawing Figures

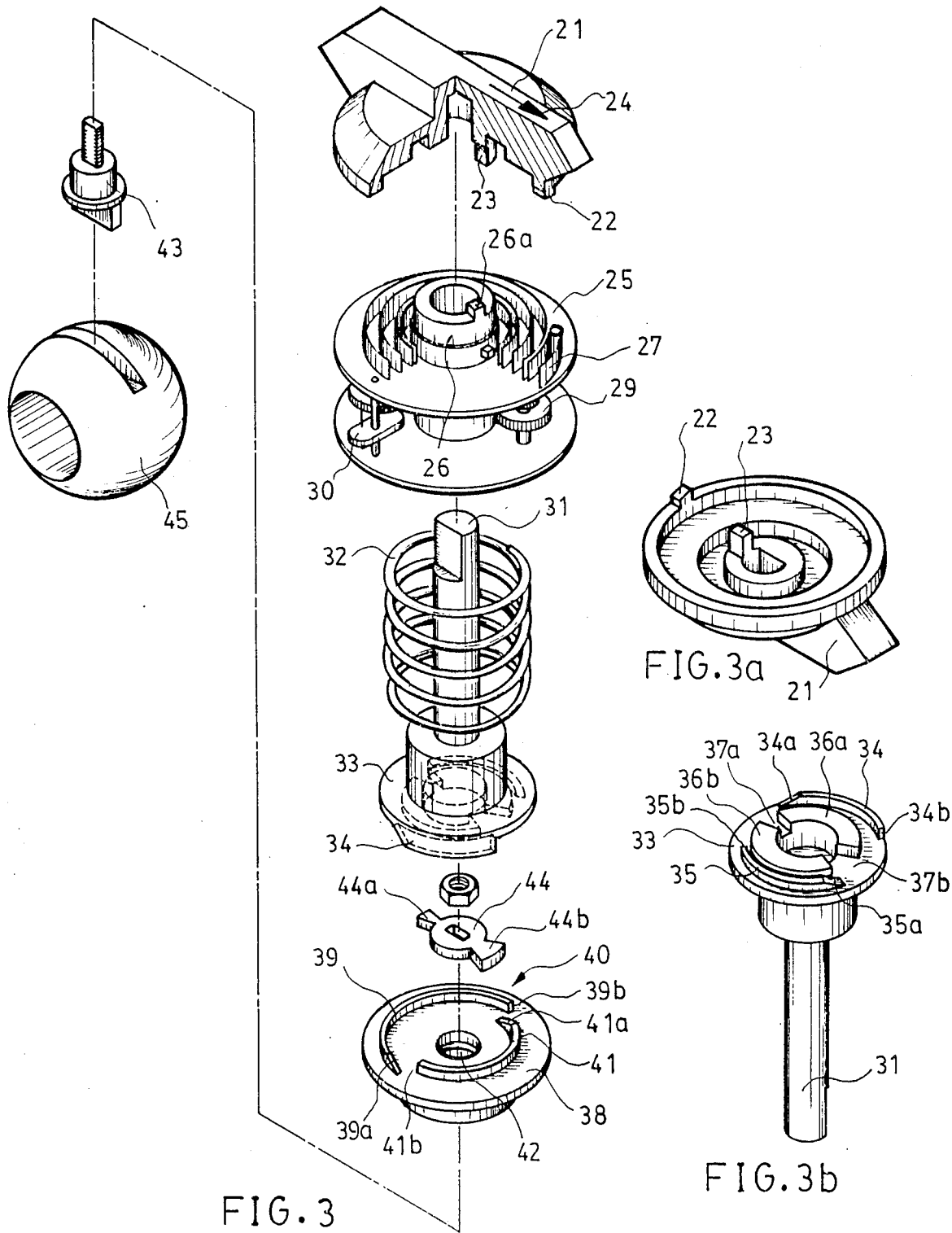

WATER FAUCET WITH TIMING DEVICE

BACKGROUND OF THE INVENTION

It is evident that water is vital to animate nature. In the ancient time, the people got water from the well or from a river or stream. Recently, the running water has been developed widely; almost all the people have been benefited from it; for instance, the general families can get water from faucet any time for any volume conveniently. The outer form and inner structure of a faucet have little change. Since the civilization is advanced continueously, the living standards of human being have been changed largely after television being introduced to our daily life. For instance, almost every housewife washes clothes with a washing machine; when operating the washing machine, she may watch a television program simultaneously. Occasionally, she might forget to close the running water of the washing machine upon watching the television program; the same thing may also happen upon providing a bath water. That un-intentional mistake would waste a lot of useful water. It is a waste to a family, a society, and a country as well. Therefore, the inventor has developed a faucet, which has a timing device to have the running water closed automatically after a given period of time.

SUMMARY OF THE INVENTION

The prime object of the present invention is to provide a water faucet with timing device, which can set a faucet ot supply water at a given period of time desired (for example, within five minutes), and which can also have the faucet closed manually at any time before reaching the time set. The faucet according to the present invention can also be set manually at the normally closed or open position.

Another object of the present invention is to provide a faucet that can be operated simply and conveniently; especially, after setting a rather long time of supplying water, it can automatically cut off the water upon reaching the time set without additional care.

Still another object of the present invention is to provide a faucet, which can simply and quickly be mounted on a water pipe for operation.

A further object of the present invention is to provide a faucet, which can be rotated optionally so as to change the direction of water flowing out of the faucet.

The faucet according to the present invention has three control positions, i.e.:

(1) A normally closed position to stop the water supply.

(2) A timing section for optionally setting a water supply period of time; upon the time set being up, the faucet will return to the normally closed position. The faucet may be set for short time water supply, such as for washing hands or face, and also set for longer time water supply, such as for washing machine or bathing, etc. The timing position may manually be set at the normally closed position any time desired.

(3) A normally open position for supplying water continuously. The faucet may manually be set at the normally closed position at any time desired, or may be re-set at any paint within the timing section for supplying water continuously until returning to the normally closed position.

In one embodiment of the present invention, there is provided with a faucet that can control the water-supplying time, and can be mounted in a water pipe quickly. In the faucet of the present invention, there is mounted with a ball member for closing the water passage normally; the ball member can also be pushed aside with a pendent lever to release the water; the pendent lever is mounted on the lower end of the valve stem that is to be actuated with a control rod. Between the valve stem and the control rod, there is installed with a clutch assembly to have the valve stem coupled with the control rod only when the valve stem being turned within an angle from 0°-90°. The control rod is connected with a timer, of which the coil spring can be wound tightly upon being rotated manually clockwise. Upon the hand releasing the control rod, the coil spring will release the tensional energy immediately to drive the control rod to rotate slowly counter-clockwise until returning to the normally closed position to cut off the water for fulfilling the timing water-supply function.

The water inlet of the water passage of the faucet is mounted with a plug-in pipe, of which the tail has several water holes. The plug-in pipe is also mounted with a connecting sleeve. The plug-in pipe can be inserted into the plug valve seat quickly, being fixed in position by means of the connecting sleeve so as to prevent it from disengaging. The plug valve seat is furnished with a spring type of automatic plug valve. Upon the plug-in pipe being inserted therein, the plug valve will be pushed open to let the water flow through.

The other objects and advantages of the present invention are described in detail with reference to the accompanying drawings that show the preferred embodiments of the present invention.

BRIEF DESCRIPTION OF THE DRAWINGS

FIG. 3 is a disassembled view of the periodic water-supply device shown in FIG. 1.

FIG. 3a is a perspective view of a knob, in reverse position, shown in FIG. 3.

FIG. 3b is a perspective view of a control rod, in reverse position, shown in FIG. 3.

DETAILED DESCRIPTION

Figure 1:
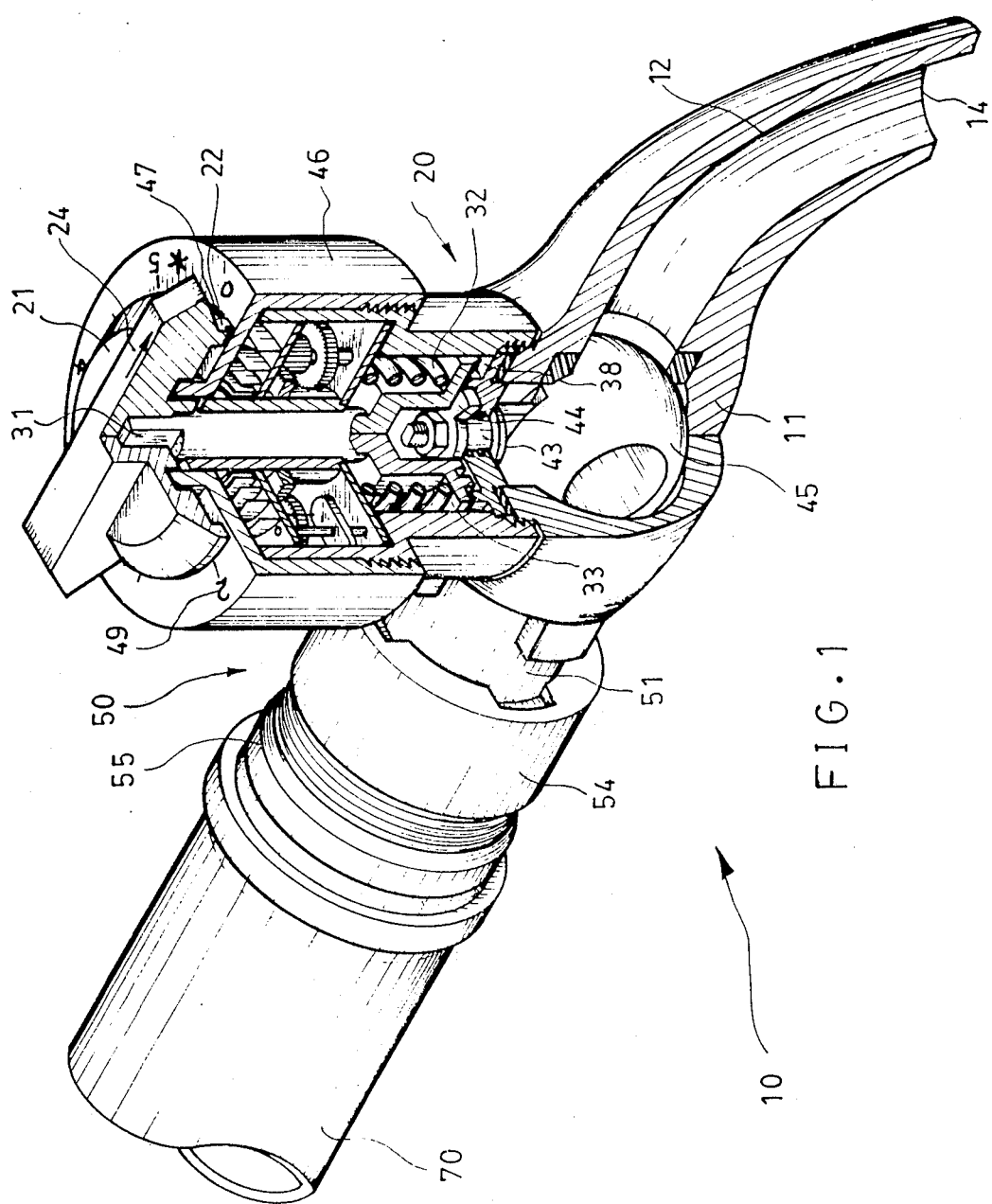
FIG. 1 is a perspective and fragmental sectional view of the first embodiment of this invention.

Referring to FIG. 1, there is shown a faucet 10 according to the present invention, which comprises a body portion 11, a timing water-supply device 20, and a connecting portion 50. The timing water-supply device 20 includes a knob 21, a timer 25, a control rod 31, and a clutch assembly 40 that consists of a rotary seat 33 and a fixed seat 38, a valve rod 43 and a ball-shaped valve 45. The connecting portion 50 includes a plug-in pipe 51, a connecting sleeve 54, and a spring-type automatic plug valve 58.

In the body portion 11 of the faucet 10, there is furnished with a water passage 12 including a water inlet 13 and an outlet 14. In the water passage 12, there is installed with a ball-shaped valve 45 to be rotated with a valve stem 43 so as to let the water flow or stop. The valve stem 43 is actuated with a control rod 31. Between the valve stem 43 and the control rod 31, there is installed a clutch assembly 40 including a rotary seat 33 and a fixed seat 38; the clutch assembly 40 can actuate the valve stem 43 via the control rod 31 only when the valve stem being set in the normally closed position "0" within an angle from 0°–90°. In the area from 90° to the normally open position "*", the valve stem 43 is in a still condition no matter the control rod 31 rotating or not. The control rod 31 is mounted with a timer 25; the top of the control rod 31 is mounted with a knob 21 that is positioned outside the case portion 46 of the timing water-supply device 20 so as to facitiate manual operation thereto. The knob 21, the control rod 31 and the rotary seat 33 are coupled one another.

Referring to FIGS. 3, 3a, and 3b, there is shown the knob 21 having a first lug 22 under the outer edge thereof and a second lug 23 under the central portion thereof. The second lug 23 is to be engaged with a lug 26a on the top of a driven shaft 26, i.e., upon rotating the knob 22 clockwise, the second lug 23 will actuate the lug 26a to cause the coil spring 27 to wind tightly so as to store a torsional energy. Upon the knob 21 being released, the coil spring 27 will release its torsional energy through the driven shaft 26, a driven gear 28, several idle gears 29, and a swinging member 30 so as to provide a retarding action and timing function; in that case, the lug 26a of the driven shaft 26 will drive the second lug 23 to cause the knob 21 the control rod 31 and the rotary seat 33 to rotate counter-clockwise slowly.

The rotary seat 33 in the clutch assembly 40 is fixedly attached to lower end of the control rod 31. The bottom surface of the rotary seat 33 is provided with a first ¼-circle-shaped flange 34 and a second ¼-circle-shaped flange 35 arranged concentrically but having different radius. One end of each of the two flanges 34 and 35 has a bevel surface 34a (or 35a), while the other end thereof has a vertical surface 34b (or 35b) perpendicular to the rotary seat 33. On the surface of the central portion of the rotary seat 33, there are furnished with two opposite semi-circular flanges 36a and 36b. The both ends of the two flanges 36a and 36b form into two guide channels 37a and 37b, of which one is larger than the other. The two guide channels 37a and 37b are so designed as to engage with two dovetail-shaped lugs 44a and 44b (being larger than 44a) on the driven member 44, whereby the control rod 31 can actuate the valve stem 43.

The fixed seat 38 of the clutch assembly 40 is mounted immediately under the rotary seat 33, and is fixed or confined in a case 46. The top surface of the fixed seat 38 is also furnished with a first and a second semi-circular flanges 39 and 41 arranged concentrically but having different radius. One end of each of the two flanges 39 and 41 has a bevel surface 39a (or 41a), which the other end thereof has a vertical surface 39b (or 41b).

After the valve stem 43 passing through a central hole 42 of the fixed seat 38, the top of the stem 43 engages with the driven member 44. Before the two ¼-circle-shaped flanges 34 and 35 of the rotary seat 33 being moved upwards on the two semi-circular flanges 39 and 41 of the fixed seat 38, the two dovetail-shaped lugs 44a and 44b of the driven member 44 are engaged with the two guide channels 37a and 37b of the rotary seat 33 respectively so as to have the valve stem 43 actuated with the control rod 31. Upon the two ¼-circle-shaped flanges 34 and 35 being moved on the two semi-circular flanges 39 and 41, the control rod 31 is lifted up to cause the driven member 44 to disengage from the two guide channels 37a and 37b; in that case, the valve stem 43 will not be actuated by the control rod 31. Since the control rod 31 is mounted with a spring 32, the control rod 31 is subject to a downward pressure of that spring.

Figure 4A:
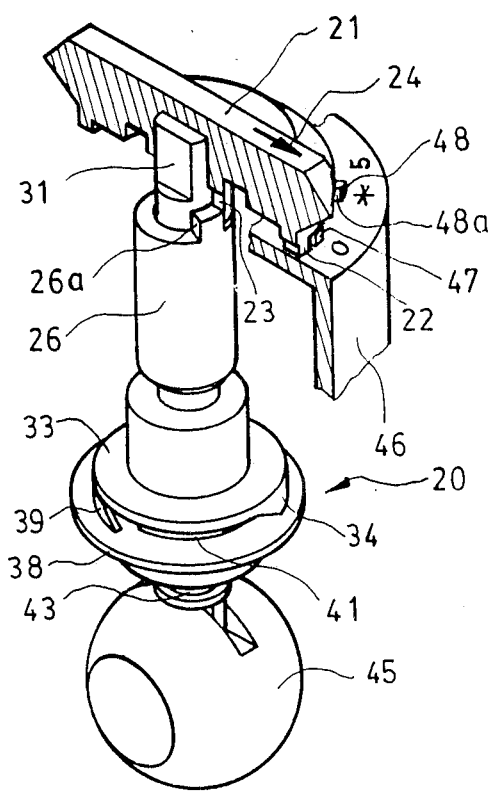
FIG. 4a illustrates the water-supply device shown in FIG. 3, being set in normally closed position.

Referring to FIG. 4a, there is shown that when the first lug 22 of the knob 21 is in contact with the stop stud 47 as indicated with the arrow mark 24 of the knob 21 pointing the normally open position "0" on the case portion 46, the two ¼-circle-shaped flanges 34 and 35 of the rotary seat 33 have not climbed over the two semi-circular flanges 39 and 41 of the fixed seat 38; the ball-shaped valve 45 is set at a cut-off position to the water.

Figure 4B:
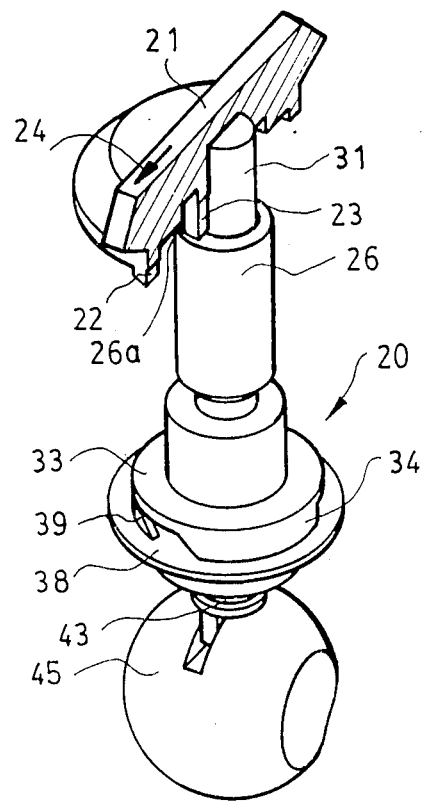
FIG. 4b illustrates the water-supply device shown in FIG. 3, being operated within 90° in normally closed position.

Referring to FIG. 4b, there is shown that when the knob 21 is rotated clockwise from the normally closed position "0" up to 90°, the two ¼-circle-shaped flange 34 and 35 of the rotary seat 33 have not been moved over the two semi-circular flanges 39 and 41 of the fixed 38; in that case, the valve stem 43 is actuated by the control rod 31, i.e., the ball-shaped valve 45 rotating from the water cut-off position to the water-flowing position.

Figure 4C:
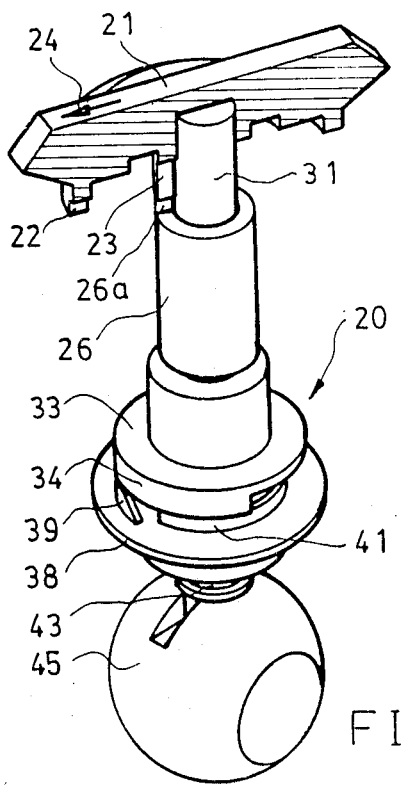
FIG. 4c illustrates the water-supply device shown in FIG. 3, being operated in normally closed position beyond 90°.

FIG. 4c indicates that when the knob 21 is rotated over 90°, the two ¼-circle-shaped flanges 34 and 35 of the rotary seat 33 will be moved over the two semi-circular flanges 39 and 41 of the fixed seat 38, i.e., the valve stem 43 being not actuated by the control rod 31 after the knob 21 rotating over 90°; in other words, upon the knob 21 rotating over 90° at any position, the ball-shaped valve 45 will stay at a full open position.

When the knob 21 at any position as shown in FIGS. 4b and 4c is released by hand, the knob 21 will slowly be driven backwards by the timer from the lug 26a on the driven shaft 26 until being stopped by the stop stud 47, i.e., the ball-shaped valve 45 being turned from partial or full open position to the cut-off position; in other words, the degree of angle of the knob 21 being set will indicate the time period of water supply. The time is indicated with numerals 49 mrked on the top of the case portion upon rotating the arrow 24 on the knob 21. Upon the knob 21 being rotated counter-clockwise manually, the knob 21 can be turned to the normally closed position "0" immediately to stop the water supply because of the second lug 23 being not stopped by the lug 26a on the driven shaft 26.

Figure 4D:
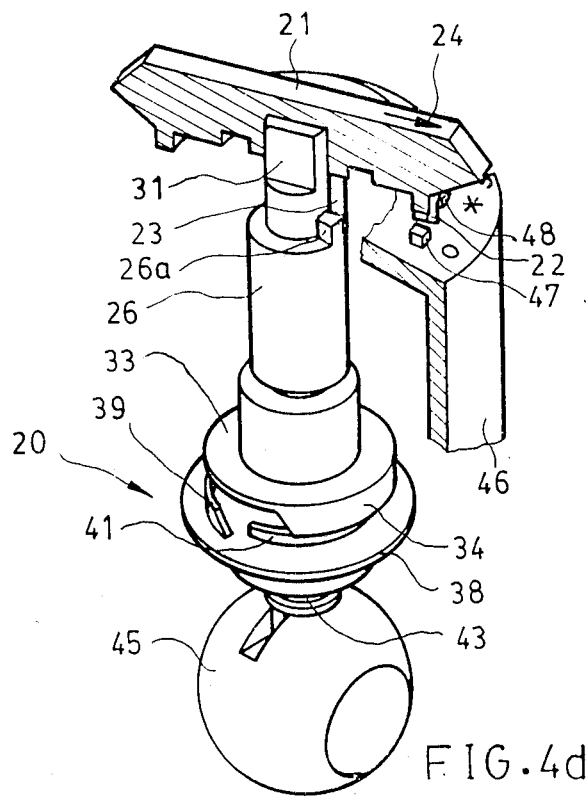
FIG. 4d illustrates the water-supply device shown in FIG. 3, being set in normally open position.

Referring to FIG. 4d, there is shown the top of the case portion 46 being provided with a lug 48 having a bevel side. Upon the knob 21 being rotated about over 330°, the first lug 22 under the knob 21 will slide over the bevel side of lug 48. In that case, the driven shaft 26 of the timer can not drive the knob 21 backwards because of the other side of lug 48 being a vertical side 48a; therefore, the faucet 10 is set at a full open position. To close the faucet to cut off the water, one has to lift the knob 21 up until it being released by lug 48 and turn the knob 21 counter-clockwise.

Figure 2:
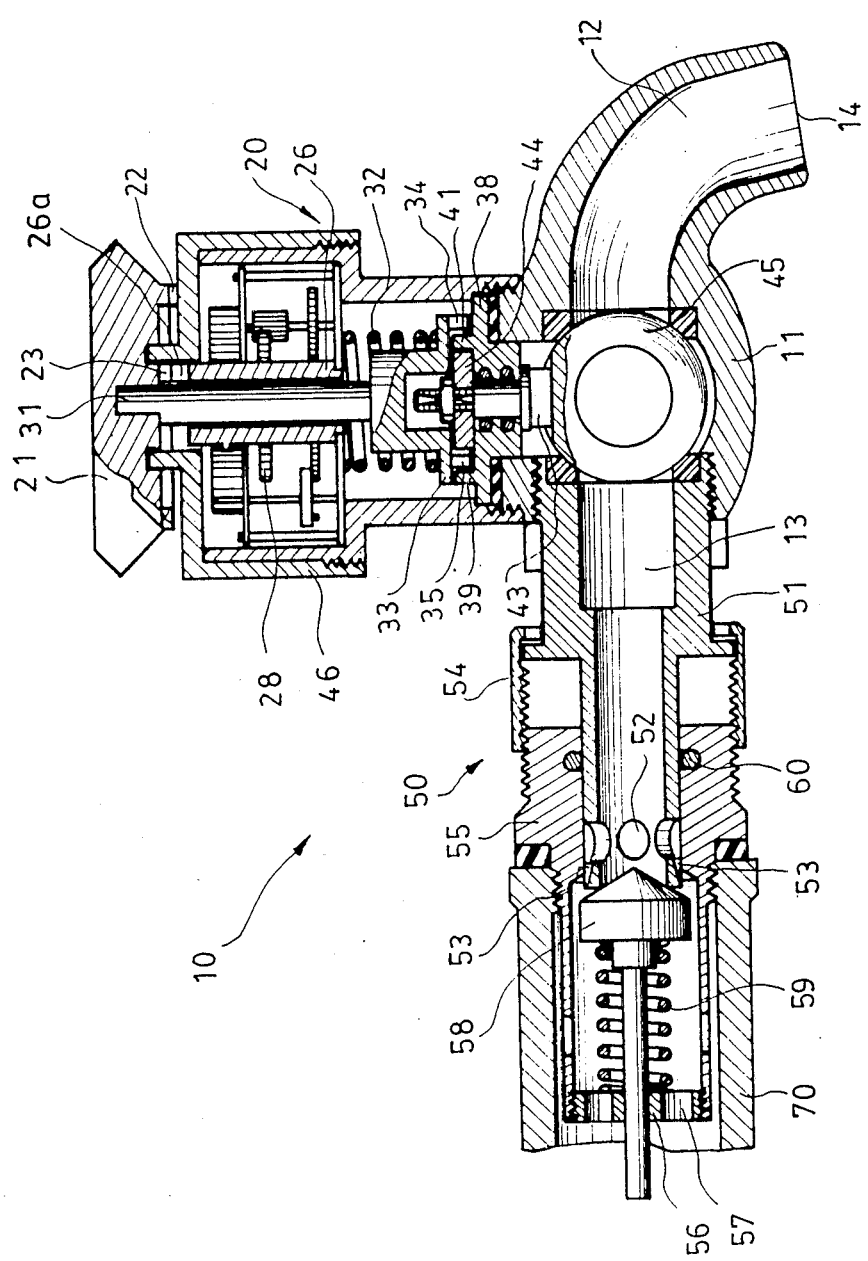
FIG. 2 is a sectional view of FIG. 1.

Referring again to FIGS. 1 and 2, there is shown a plug-in pipe 51 connected on the water inlet 13 of the body portion 11. The tail portion of the plug-in pipe 51 is furnished with several water holes 52, of which each is communicated with a taper hole 53. The taper hole 53 may be a groove without penetrating through the wall of the plug-in pipe 51. The outer surface of the plug-in pipe 51 is mounted with a rotatable connecting sleeve 54. The plug-in pipe 51 is inserted into a plug valve seat 55 that is fixed on the outlet of water pipe 70. In the plug valve seat 55, a spring-type automatic plug valve 58 is mounted for automatically closing the plug valve seat 55 normally by means of the water stream pressure and spring 59 pressure so as to cut off the water. The tail of the spring 59 is fixed on a spring seat 56 which has several water holes 57; the spring seat 56 is fixed in the tail portion of the plug valve seat 55.

Upon the plug-in pipe 51 being inserted into the plug valve seat 55, the plug valve 58 will be pushed toward the tail portion of seat 55 so as to have water flow, via the taper holes 53 on the tail portion of the plug-in pipe 51 and via the water holes 52, into the plug-in pipe 51 and the water passage 12 of the body portion 11. After the plug-in pipe 51 being inserted into the play valve seat 55, mount the connecting sleeve 54 on the plug valve seat 55 to provent the plug-in pipe 51 from being separated from the seat 55. The length of the plug-in pipe 51 being inserted into the seat 55 will determine the water volume flowing in the pipe 51.

Between the inner wall of the plug valve seat 55 and the outer contact surface of the plug-in pipe, there is installed with a ring-shaped seal 60 to prevent the water from leaking.

Figure 5:
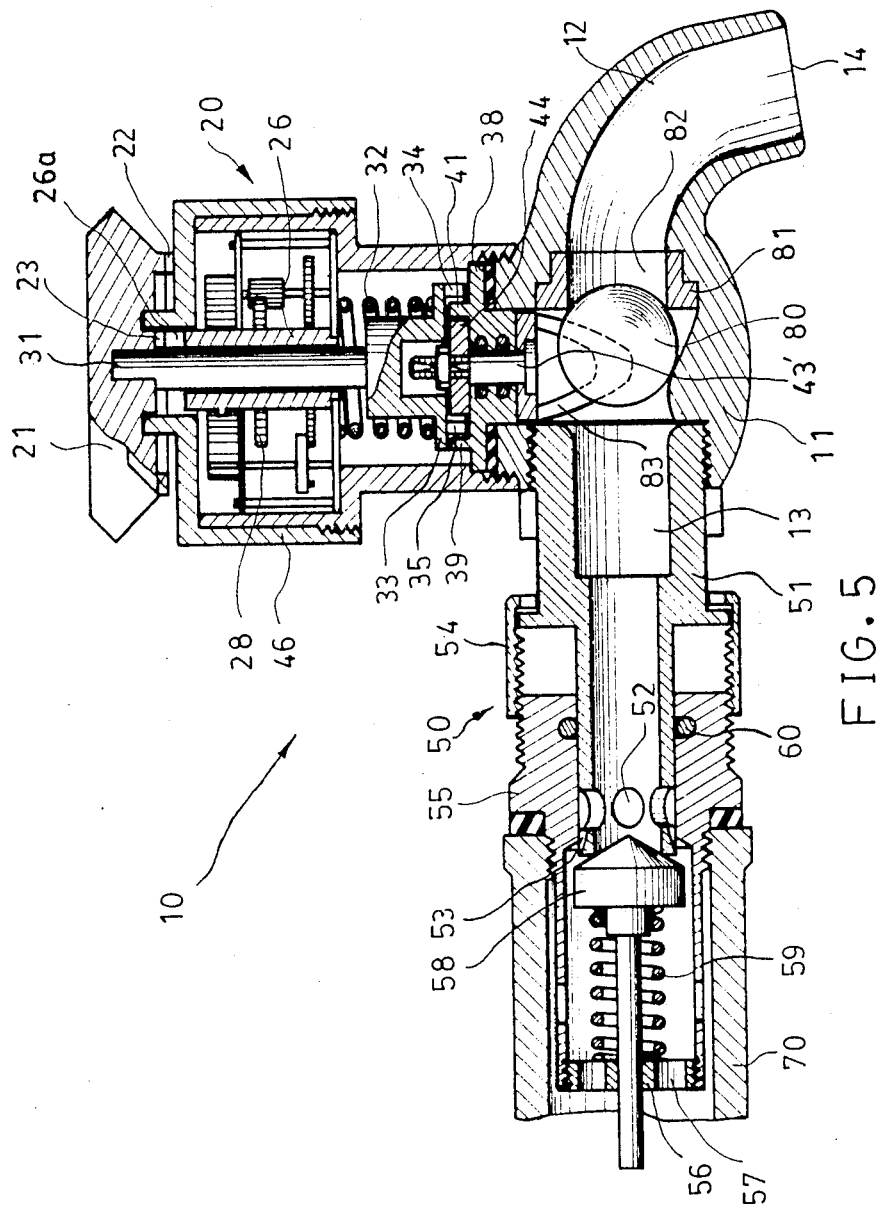
FIG. 5 is a sectional view of the second embodiment of the present invention.

FIG. 5 illustrates another embodiment of the present invention, in which no ball-shaped valve 45 is installed in the water passage 12; instead, a ball seat 81 with a central hole 82 is installed; further, the valve stem 43' is not connected directly with the ball 80, but it is connected with a pendent lever 83. When the knob 21 is pointing the normally closed position "0", the pendent lever 83 is separated from the ball 80; then, the ball 80 will close the central hole 82 as a result of the weight of the ball 80 and the water stream pressure, and the water is cut off. Upon the knob 21 being rotated clockwise, the valve stem 43' will be actuated by the knob 21 within an angle ranging from the normally closed position up to 90°. Since the pendent lever 83 is coupled with the valve stem 43', the pendent lever 83 will push the ball 80 away from the central hole 82 upon the knob 21 being rotated, and then the water will flow through the central hole 82 out of the body portion 11.

It is expected that the embodiments shown in the drawings according to the present invention may be changed, modified or added with some improvements without deviating from the spirit and scope of the present invention; therefore, the present invention can only be limited by the claims attached to the specification thereof.

I claim:

1. A water faucet with timing device comprising:

a knob of which the outer edge of bottom has a first lug, and the bottom surface near the central portion has a second lug;

a control rod being attached to the bottom of said knob;

a timer mounted on said control rod; and said timer including a coil spring that can store a torsional energy upon being wound with said knob, a driven shaft connected with the center end of said coil spring and a driven gear, a swinging member, and several idle gears being engaged one another and also engaged with said driven gear and said swinging member; and the top of said driven shaft having a lug being in contact with the second lug of said knob;

a spring being mounted between said timer and said control rod;

a rotary seat attached to the lower end of said control rod; and under the bottom of said rotary seat, two ¼-circle-shaped flanges being furnished, and one end of said ¼-circle-shaped flange having a bevel surface, while the other end of said ¼-circle-shaped flange having a vertical end; and the bottom surface of said rotary seat being furnished with guide channels;

a fixed seat being fixed in position under said rotary seat; and the top of said fixed seat being furnished with several semi-circular flanges, of which one end of each has a bevel surface, while the other end has a vertical surface; and said fixed seat having a central hole; and a valve to control the water stream; and valve stem of said valve passing through the central hole of said fixed seat and then being connected with a driven member; and before the several ¼-circle-shaped flanges under the bottom of said rotary seat climbing over the several semi-circular flanges on said fixed seat, said driven member being caught in the guide channels under the bottom of said rotary seat; otherwise, said driven member being not caught in said guide channels.

2. A water faucet as claimed in claim 1, which further comprises a case portion, of which the top is provided with a stop stud for stopping the first lug of said knob, and a lug with a bevel side for stopping, in one direction, the first lug of said knob.

3. A water faucet as claimed in claim 1, wherein said valve comprises a pendent lever mounted under the bottom end of said valve stem, a ball seat with a central hole, and a ball that can close said central hole by means of its weight and the water stream pressure before being driven by said pendent lever.

* * * * *